United States Patent [19]
Hosoi

[11] Patent Number: 6,097,971
[45] Date of Patent: Aug. 1, 2000

[54] HANDS-FREE SPEECH COMMUNICATION APPARATUS

[75] Inventor: Yoshiaki Hosoi, Saitama, Japan

[73] Assignee: NEC Corporation, Tokyo, Japan

[21] Appl. No.: 08/844,656

[22] Filed: Apr. 21, 1997

[30] Foreign Application Priority Data

Apr. 23, 1996 [JP] Japan ................................ 8-101412

[51] Int. Cl.[7] .................................................. H04B 1/38
[52] U.S. Cl. ..................... 455/570; 455/550; 379/406; 379/410
[58] Field of Search .................... 455/550, 560, 455/570, 569; 379/406, 410, 411, 3, 407, 408, 409

[56] References Cited

U.S. PATENT DOCUMENTS 5,353,348 10/1994 Sendyk et al. .
5,479,502 12/1995 Ohga et al. ............................ 379/406
5,604,799 2/1997 Komoda et al. ....................... 379/410

FOREIGN PATENT DOCUMENTS 0 712 213 A2  5/1996  European Pat. Off. .
5-75500       3/1993  Japan .
575500        3/1993  Japan .
WO 89/05068   6/1989  WIPO .

OTHER PUBLICATIONS

R. Roncella et al., "Single–chip adaptive FIR filter for acoustic echo canceller board," *Single Processing European Journal Devoted to the Methods and Applications of Signal Processing*, vol. 27, No. 3, Jun. 1992.

*Primary Examiner*—Reinhard J. Eisenzopf
*Assistant Examiner*—Greta J. Fuller
*Attorney, Agent, or Firm*—Sughrue, Mion, Zinn, Macpeak & Seas, PLLC

[57] ABSTRACT

In a hands-free speech communication apparatus incorporating an echo canceler in a mobile telephone, a howling prevention unit for preventing howling caused due to leakage of a mobile-side loudspeaker output voice into a mobile-side microphone input during hands-free speech communication and an echo canceler for canceling an echo generated due to leakage of a transmission voice signal from a self line output terminal into a reception voice signal input to a self line input terminal are constituted by a one-chip digital signal processor. The digital signal processor is controlled by a microprocessor incorporated in an external cellular phone, thereby controlling/processing operation parameters of the howling prevention unit and the echo canceler on the basis of software.

8 Claims, 5 Drawing Sheets

HANDS-FREE SPEECH COMMUNICATION APPARATUS

BACKGROUND OF THE INVENTION

1. Field of the Invention

The present invention relates to a hands-free speech communication apparatus and, more particularly, to a hands-free speech communication apparatus incorporating an echo canceler in, e.g., a mobile telephone.

2. Description of the Prior Art

Referring to FIG. 1, a hands-free speech communication apparatus as the first prior art which incorporates an echo canceler and is used for a mobile telephone is realized by simply connecting, as a hardware structure, a device 9 dedicated to the echo canceler, and a voice switch 7 and a line gain correction circuit 6 which are realized by discrete parts and the like. That is, the circuits of the device 9 dedicated to the echo canceler, the voice switch 7, and the line gain correction circuit 6 independently operate.

As the second prior art, a "howling prevention apparatus" disclosed in Japanese Unexamined Patent Publication No. 5-75500, i.e., a prior art of a hands-free speech communication apparatus used for a TV conference system and incorporating an echo canceler will be described. Referring to a block diagram in FIG. 2, the howling prevention apparatus for a bidirectional speech communication apparatus having an open-loop closed circuit constituted by acoustic coupling between a microphone 31 for inputting a transmission voice and a loudspeaker 34 for outputting a reception voice comprises an echo canceler 35 which generates a pseudo echo from an output signal from the bidirectional speech communication apparatus and subtracts this pseudo echo from an input signal to the bidirectional speech communication apparatus, thereby removing an echo passing through the open-loop closed circuit, an attenuation amount calculation unit 36 for calculating, on the basis of the acoustic coupling gain, the echo cancel amount of the echo canceler 35, and the amplified gain of the open-loop closed circuit, an attenuation amount for setting the gain of the open-loop closed circuit to one or less, and a voice switch 37 for inserting/controlling, into/in the open-loop closed circuit, the attenuation amount calculated by the attenuation amount calculation unit 36. The echo canceler 35 calculates a coefficient by a coefficient estimating operation and multiplies the calculated coefficient with the output signal from the bidirectional speech communication apparatus, thereby generating the pseudo echo.

The acoustic coupling gain is approximately calculated on the basis of the converged value of the coefficient of the echo canceler 35. The echo cancel amount is approximately calculated by obtaining the power ratio between the input signal to the echo canceler and the residual echo.

The voice switch 37 forcibly inserts an infinite attenuation amount regardless of the calculation result from the attenuation amount calculation unit 36 until the attenuation amount calculated by the attenuation amount calculation unit 36 decreases to a value for allowing concurrent bidirectional speech communication. When the attenuation amount calculated by the attenuation amount calculation unit 36 is larger than the value for enabling concurrent bidirectional speech communication, the voice switch 37 divides the voice signal transmission band into a plurality of bands and independently sets the attenuation amount to be inserted in units of divided bands. In addition, when the attenuation amount calculated by the attenuation amount calculation unit 36 is larger than the value for allowing the concurrent bidirectional speech communication, the voice switch 37 performs Fourier transform of the voice signal and independently sets the attenuation amount to be inserted in units of frequency components obtained upon Fourier transform.

Each of these conventional hands-free speech communication apparatuses incorporating echo cancelers requires the device dedicated to the echo canceler and the voice switch circuit realized by discrete parts, resulting in a large circuit scale and high cost. The echo canceler and the voice switch independently operate. For this reason, when the loss of the voice switch is reduced in consideration of the cancel amount of the echo canceler, howling may be generated before the echo canceler exhibits a sufficient effect. When the loss of the voice switch is set to control the howling, the loss of the line becomes too large while the echo canceler exhibits a sufficient effect, and the concurrent speech communication properties undesirably degrade.

In each of these conventional hands-free speech communication apparatuses incorporating echo cancelers, the gain, time constant, operating point (threshold), and the like of each circuit must be changed for each country because of the difference between line gains in various countries.

SUMMARY OF THE INVENTION

The present invention has been made in consideration of the above situations of the prior arts, and has as its object to realize a hands-free speech communication apparatus incorporating an echo canceler, in which conventional hand-free speech communication apparatus hardware used for a digital mobile telephone, TV conference system, or the like is constituted by a digital signal processor (DSP) using hand-free speech communication software to reduce the circuit scale and cost, and simultaneously, cope with the difference between line gains in various countries only by inputting external commands/data to change operation parameters, unlike the prior arts depending on changes of constants of parts, thereby improving the productivity without changing the production line, hardware, or software.

In order to achieve the above object, according to the first aspect of the present invention, there is provided a hands-free speech communication apparatus incorporating an echo canceler in a mobile telephone, wherein howling prevention means for preventing howling caused due to leakage of a mobile-side loudspeaker output voice into a mobile-side microphone input during hands-free speech communication and echo cancel means for canceling an echo generated due to leakage of a transmission voice signal from a self line output terminal into a reception voice signal input to a self line input terminal are constituted by a one-chip digital signal processor, and the digital signal processor is controlled by a microprocessor incorporated in an external cellular phone, thereby controlling/processing operation parameters of the howling prevention means and the echo cancel means on the basis of software.

According to the second aspect of the present invention, there is provided a hands-free speech communication apparatus comprises: a line-side echo canceler having first addition means for adding, to a first reception voice signal input from a line side to a reception input terminal, a second hands-free transmission signal in which a first hands-free transmission signal sent from a transmission output terminal to the line side is adaptively controlled to cancel a component which leaks from the first hands-free transmission signal into the reception voice signal, and outputting a second reception voice signal, and a first adaptive filter for adaptively controlling the first hands-free transmission signal in accordance with the second reception voice signal output from the first addition means and outputting and supplying the second hands-free transmission signal to the first addition means; a voice switch having first attenuation means, controlled by a first control signal, for applying a predetermined attenuation amount for preventing howling to the second reception voice signal output from the first addition means of the line-side echo canceler and outputting a third reception voice signal to a mobile-side loudspeaker output terminal, second attenuation means, controlled by second and third control signals, for applying a predetermined attenuation amount to a third hands-free transmission signal in which the third reception voice signal component which leaks from the mobile-side loudspeaker output terminal into a mobile-side microphone input terminal is canceled to cancel an echo, and outputting the first hands-free transmission signal, and first attenuation amount control means for outputting the second control signal in accordance with a level of the third hands-free transmission signal and outputting the first control signal in accordance with a level of the second reception voice signal; a mobile-side echo canceler having second addition means for adding, to a fourth hands-free transmission signal input to the mobile-side microphone input terminal, a fourth reception voice signal in which the third reception voice signal output to the mobile-side loudspeaker output terminal is adaptively controlled to cancel a component which leaks from the third reception voice signal into the fourth hands-free transmission signal, and outputting the third hands-free transmission signal, and a second adaptive filter for adaptively controlling the third reception voice signal in accordance with the third hands-free transmission signal output from the second addition means and outputting and supplying the fourth reception voice signal to the second addition means; and echo cancel amount detection processing means for comparing the fourth hands-free transmission signal with the third hands-free transmission signal to detect an echo cancel amount of the mobile-side echo canceler and outputting the third control signal corresponding to the echo cancel amount, wherein the line-side echo canceler, the voice switch, the mobile-side echo canceler, and the echo cancel amount detection processing means are constituted by a one-chip digital signal processor, and operation parameters of the line-side echo canceler, the voice switch, the mobile-side echo canceler, and the echo cancel amount detection processing means are controlled on the basis of software by a microprocessor incorporated in an external cellular phone.

According to the second aspect of the present invention, there is also provided a hands-free speech communication apparatus further comprising line gain correction processing means having third attenuation means, controlled by a fourth control signal, for applying a predetermined attenuation amount for downlink line gain correction to the second reception voice signal output from the first addition means of the line-side echo canceler, and outputting the reception voice signal to the first attenuation means of the voice switch, fourth attenuation means, controlled by a fifth control signal, for applying a predetermined attenuation amount for uplink line gain correction to the first hands-free transmission signal output from the second attenuation means of the voice switch, and outputting the transmission signal to a transmission output terminal and the first adaptive filter of the line-side echo canceler, and second attenuation amount control means for outputting the fourth control signal in accordance with the level of the second reception voice signal output from the first addition means and outputting the fifth control signal in accordance with a level of the first hands-free transmission signal output from the second attenuation means of the voice switch, and wherein the line gain correction processing means is constituted in the one-chip digital signal processor, and operation parameters of the third attenuation means, the fourth attenuation means, and the second attenuation amount control means are controlled/processed on the basis of software by the microprocessor incorporated in the external cellular phone.

According to the aspects of the present invention, the main portion of the hands-free speech communication incorporating the echo canceler is constituted by the one-chip DSP. With this arrangement, reduction in the circuit scale and cost can be realized. In addition, by realizing the echo canceler and the voice switch in the one-chip DSP, the short echo cancel amount during the convergence of the tap coefficient of the echo canceler can be compensated by the voice switch, so that howling can be prevented. Furthermore, when the echo canceler is sufficiently canceling the echo, hands-free speech communication with satisfactory concurrent speech communication properties and free from the sense of switching can be realized.

By only changing the initial parameter values of the main CPU software of the external cellular phone, the difference between line gains in various countries can be coped with without changing the hardware and software in the hands-free speech communication apparatus incorporating the echo canceler.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENTS

Figure 1:
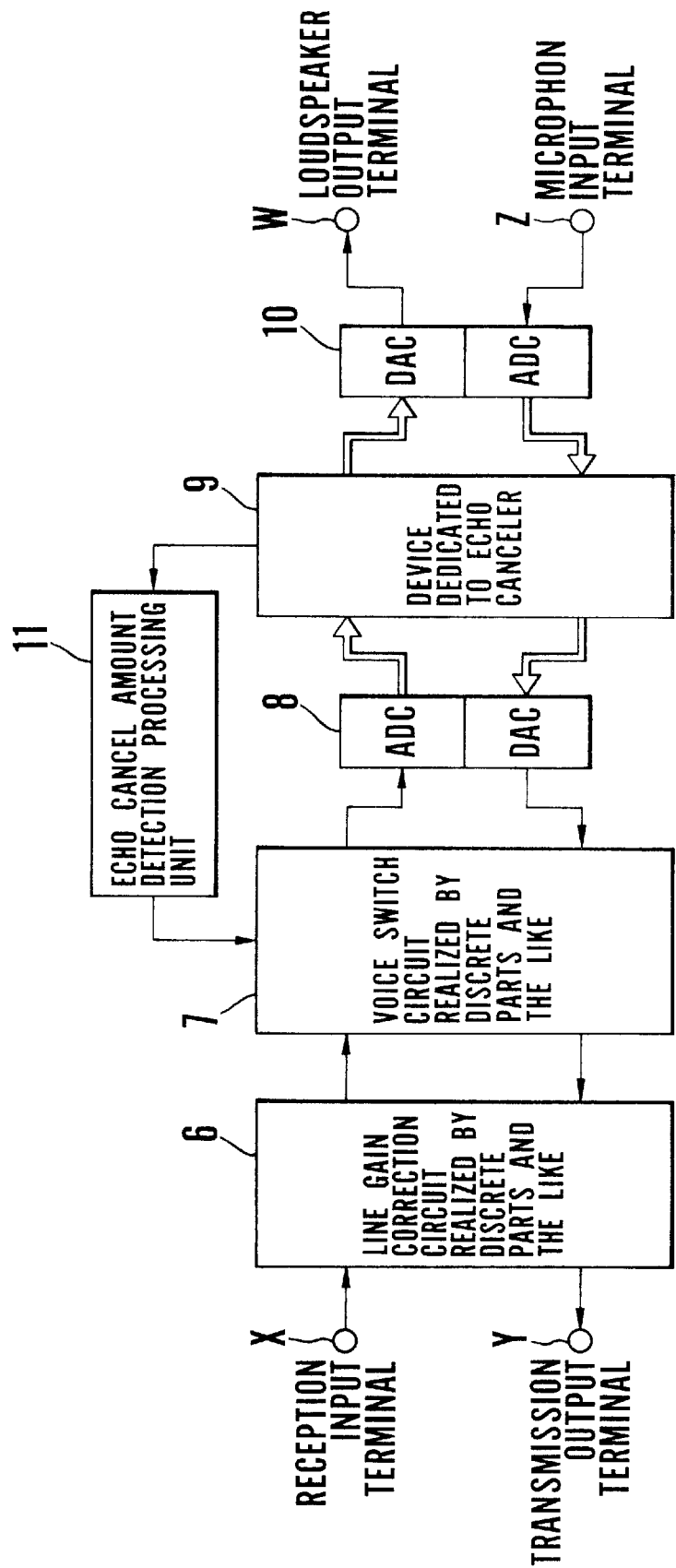
FIG. 1 is a block diagram showing the hardware arrangement of a hands-free speech communication apparatus as the first prior art.
Figure 2:
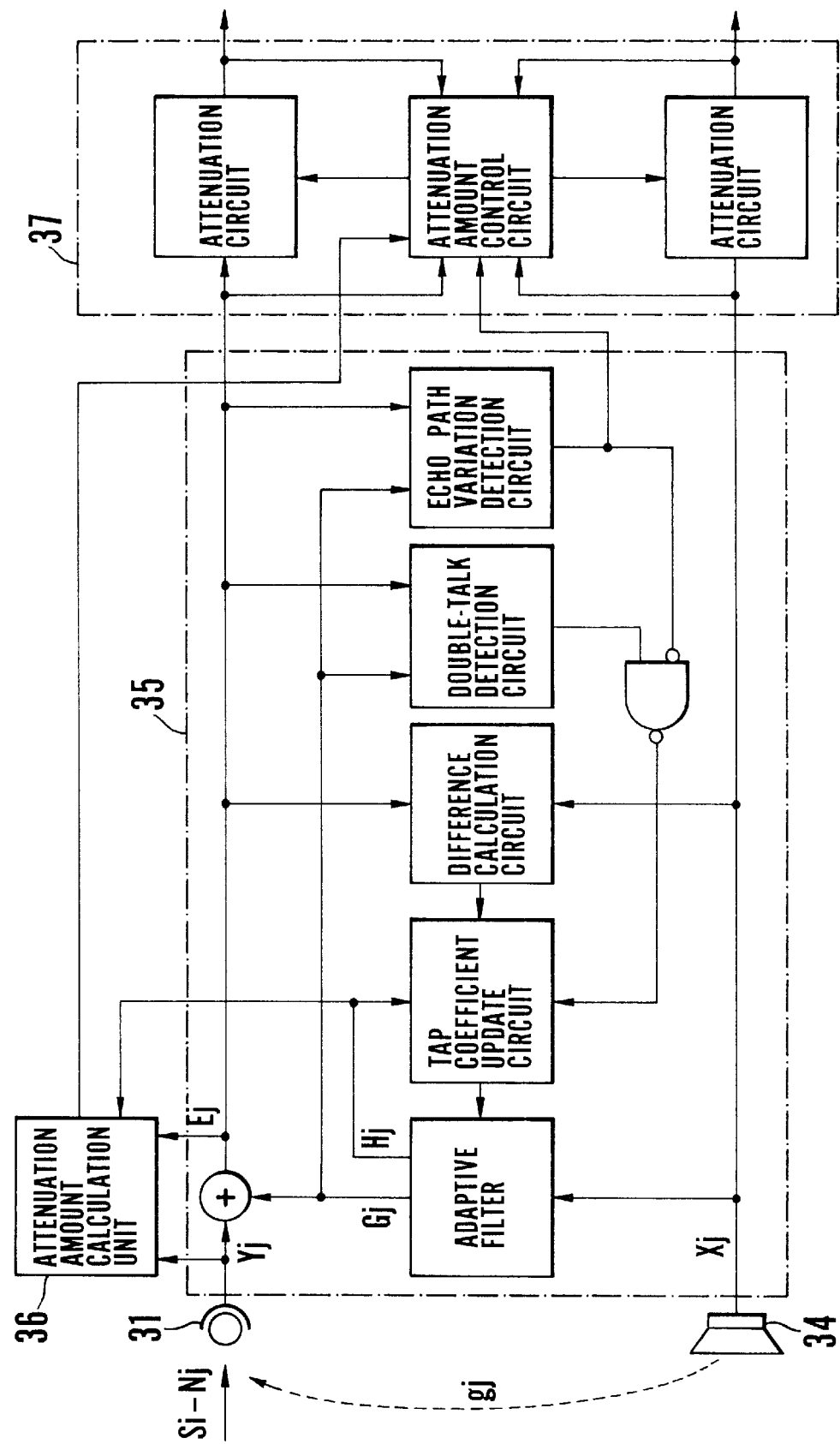
FIG. 2 is a block diagram showing a howling prevention apparatus as the second prior art.

The preferred embodiments of the present invention will be described below with reference to the accompanying drawings. Referring to the block diagram in FIG. 4 which illustrates the first embodiment of the present invention, a hands-free speech communication apparatus comprises a line-side echo canceler 20, a voice switch 21, a mobile-side echo canceler 22, and a mobile-side echo cancel amount detection processing unit 23. The line-side echo canceler 20 has an adder 200 for adding, to a reception voice signal f input from a line side to a reception input terminal A, a hands-free transmission signal h in which a hands-free transmission signal g sent from a transmission output terminal D to the line side is adaptively controlled to cancel a component which leaks from the hands-free transmission signal g into the reception voice signal f, and, outputting a reception voice signal j, and an adaptive filter 201 for adaptively controlling the hands-free transmission signal g in accordance with the reception voice signal j output from the adder 200 and outputting and supplying the hands-free transmission signal h to the adder 200. The voice switch 21 has a reception system loss processing unit 213 which is controlled by a reception system loss control signal k to apply a predetermined attenuation amount for preventing howling to the reception voice signal j output from the adder 200 of the line-side echo canceler 20 and outputs a reception voice signal m to a mobile-side loudspeaker output terminal B, a transmission system loss processing unit 214 which is controlled by a transmission system loss control signal n and a transmission system loss control signal p to apply a predetermined attenuation amount to a hands-free transmission signal q in which the reception voice signal m component which leaks from the mobile-side loudspeaker output terminal B into a mobile-side microphone input terminal C is canceled to cancel the echo, and outputs the hands-free transmission signal g, and a loss processing control unit 212 for outputting the transmission system loss control signal n in accordance with the level of the hands-free transmission signal q and outputting the reception system loss control signal k in accordance with the level of the reception voice signal j. The mobile-side echo canceler 22 has an adder 221 for adding, to a hands-free transmission signal r input to the mobile-side microphone input terminal C, a reception voice signal s in which the reception voice signal m output to the mobile-side loudspeaker output terminal B is adaptively controlled to cancel a component which leaks from the reception voice signal m into the hands-free transmission signal r, and outputting the hands-free transmission signal q, and an adaptive filter 220 for adaptively controlling the reception voice signal m in accordance with the hands-free transmission signal q output from the adder 221 and outputting and supplying the reception voice signal s to the adder 221. The mobile-side echo cancel amount detection processing unit 23 compares the hands-free transmission signal r with the hands-free transmission signal q to detect the echo cancel amount of the mobile-side echo canceler 22 and outputs the transmission system loss control signal p corresponding to the echo cancel amount. The line-side echo canceler 20, the voice switch 21, the mobile-side echo canceler 22, and the mobile-side echo cancel amount detection processing unit 23 are constituted by a one-chip digital signal processor. With this arrangement, the operation parameters of the line-side echo canceler 20, the voice switch 21, the mobile-side echo canceler 22, and the mobile-side echo cancel amount detection processing unit 23 are controlled/processed on the basis of software by a microprocessor incorporated in an external, e.g., cellular phone.

Figure 3:
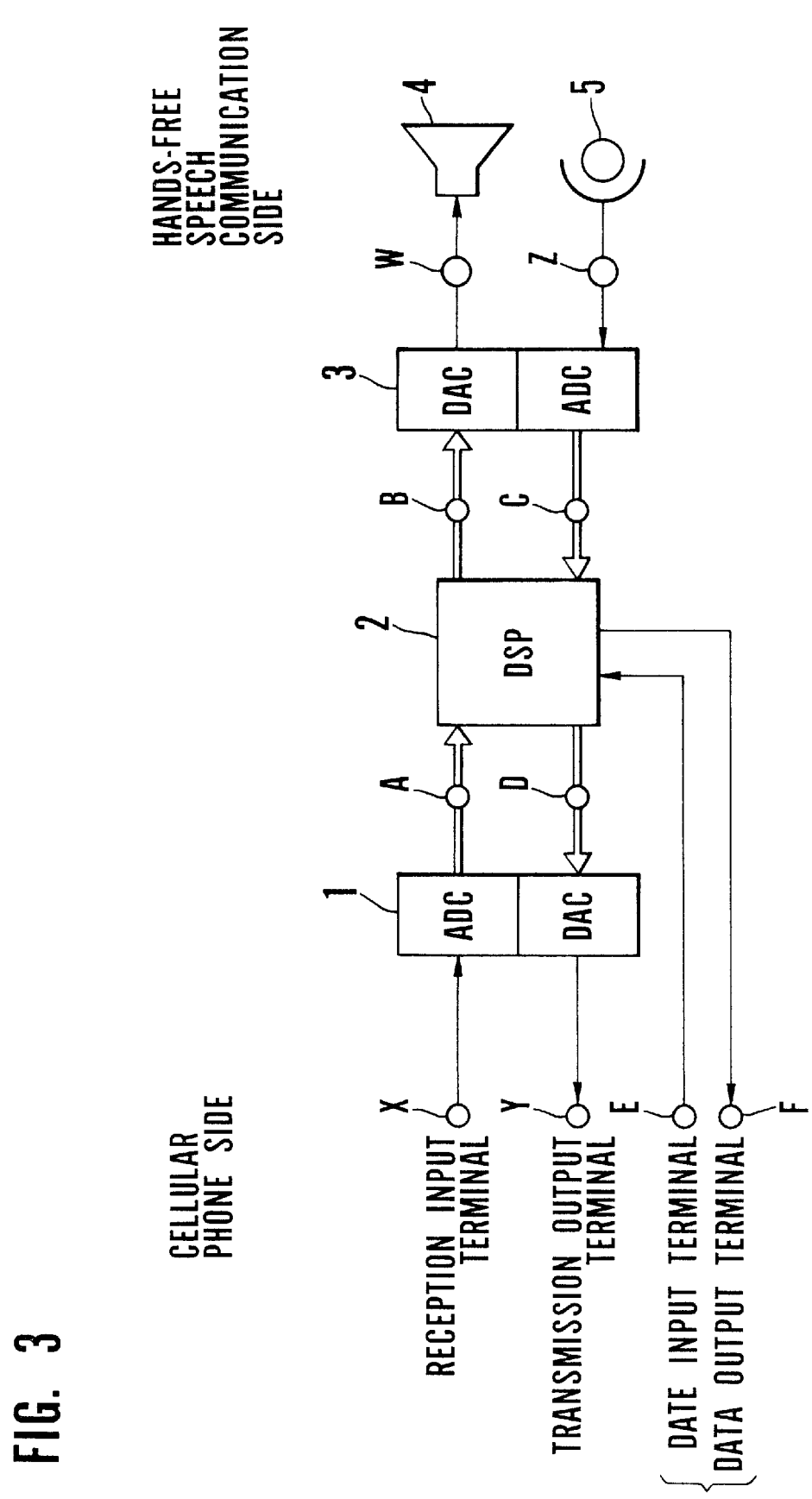
FIG. 3 is a block diagram showing the hardware arrangement of a hands-free speech communication apparatus of the present invention.
Figure 5:
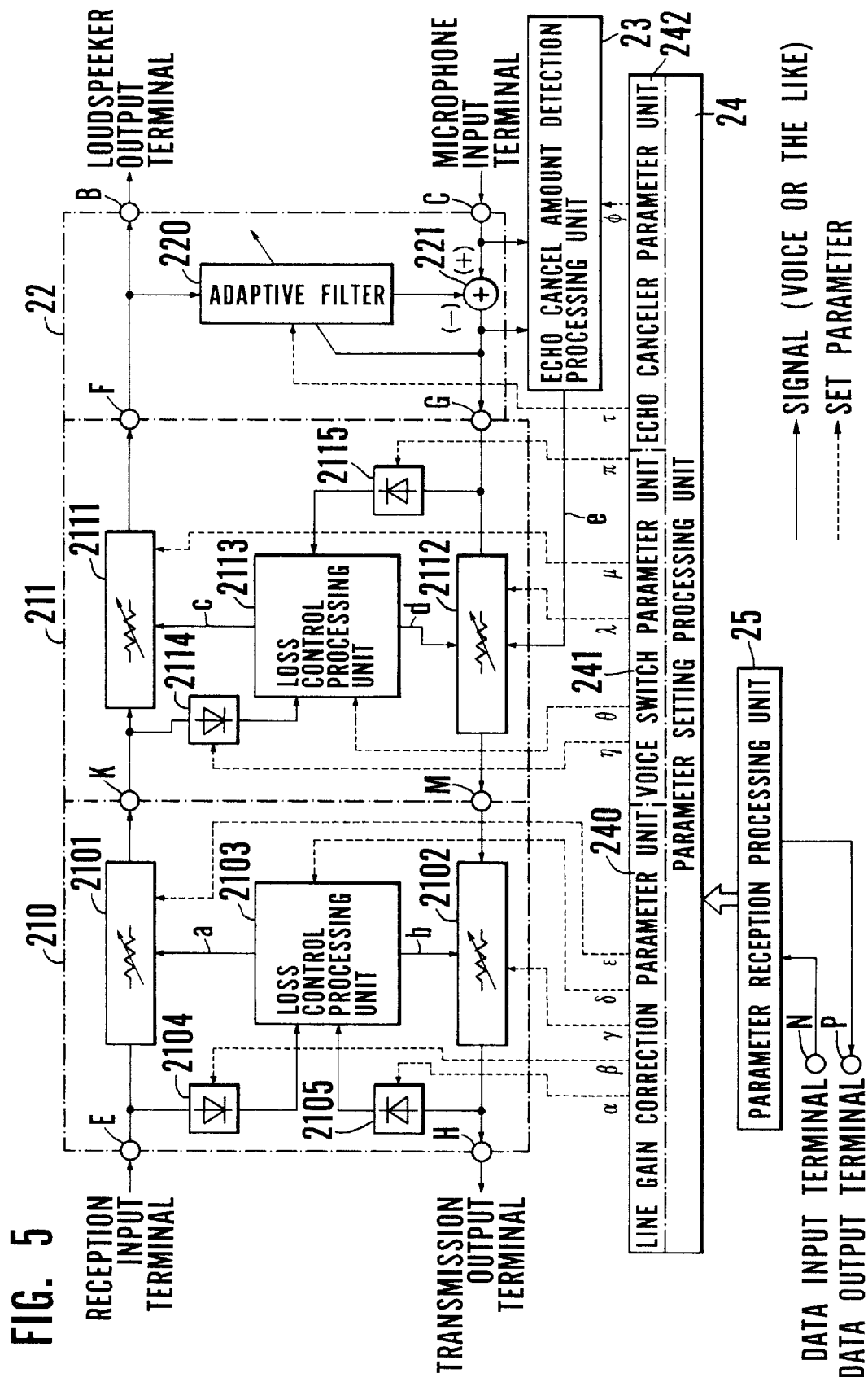
FIG. 5 is a block diagram showing the algorithm function of a hands-free speech communication apparatus according to the second embodiment of the present invention.

The second embodiment of the present invention will be described next with reference to the accompanying drawings. FIG. 3 is a block diagram showing the hardware arrangement of a hands-free speech communication apparatus of the present invention. FIG. 5 is a functional block diagram showing the algorithm of a hands-free speech communication apparatus according to the second embodiment of the present invention. Referring to FIG. 5, a digital signal processor 2 shown in FIG. 3 is constituted by a line gain correction processing unit 210, a voice switch processing unit 211, a mobile-side echo canceler unit 22, an echo cancel amount detection processing unit 23, a parameter setting processing unit 24, and a parameter reception processing unit 25. The line gain correction processing unit 210 is constituted by a loss control processing unit 2103, a transmission system loss processing unit 2102, a reception system loss processing unit 2101, a reception input level detection rectifier 2104, and a transmission output level detection rectifier 2105. The voice switch processing unit 211 is constituted by a loss control processing unit 2113, a transmission system loss processing unit 2112, a reception system loss processing unit 2111, a reception level detection rectifier 2114, and a transmission level detection rectifier 2115. The mobile-side echo canceler unit 22 is constituted by an adaptive filter 220 and an adder 221. The parameter setting processing unit 24 is constituted by the setting processing units of a line gain correction parameter unit 240, a voice switch parameter unit 241, and an echo canceler parameter unit 242. The parameter reception processing unit 25 has a serial interface (I/F) unit to the main CPU of an external cellular phone.

The hardware arrangement of the hands-free speech communication apparatus will be described next. The block diagram in FIG. 5 shows the algorithm function of processing in the DSP shown in FIG. 3. FIG. 3 shows, as the hardware structure, a four-terminal network for inputting/outputting voices, in which ADCs/DACs (analog-to-digital/digital-to-analog converters) 1 and 3 are connected to the input and output terminals of the DSP 2 to input and output a reception voice and a transmission voice, respectively, and the main CPU of the cellular phone externally connected via the serial I/F controls processing in the digital signal processor 2 independently of input/output of the transmission/reception voice.

The operation will be described below. Referring to FIG. 5, a mobile-side transmission voice from the ADC of the ADC/DAC 3 shown in FIG. 3 is input from a microphone input terminal C and input to the transmission system loss processing unit 2112 of the voice switch processing unit 211 while the echo circulating from a loudspeaker output terminal B side is canceled by the mobile-side echo canceler unit 22. The transmission voice is attenuated by an amount controlled by a control signal d from the loss control processing unit 2113 and a control signal e from the echo cancel amount detection processing unit 23 and output to the line gain correction processing unit 210. The transmission voice input to the transmission system loss processing unit 2102 of the line gain correction processing unit 210 is attenuated by an amount controlled by a control signal b from the loss control processing unit 2103, output from a transmission output terminal D as a transmission voice output, and supplied to the DAC of the ADC/DAC 1 shown in FIG. 3.

A line-side reception voice from the ADC of the ADC/DAC 1 shown in FIG. 3 is input from a reception input terminal A and input to the reception system loss processing unit 2101 of the line gain correction processing unit 210. The reception voice is attenuated by an amount controlled by a control signal a from the loss control processing unit 2103 and output to the voice switch processing unit 211. The reception voice input to the reception system loss processing unit 2111 of the voice switch processing unit 211 is attenuated by an amount controlled by a control signal c from the loss control processing unit 2113 and output to the mobile-side echo canceler unit 22. The line-side reception voice input to the mobile-side echo canceler unit 22 is used as a reference input for the mobile-side echo and also supplied from the loudspeaker output terminal B to the ADC unit of the ADC/DAC 3 shown in FIG. 3.

The operation will be described below in more detail.

In the line gain correction processing unit 210, the loss control processing unit 2103 compares the transmission voice level detected by the transmission output level detection rectifier 2105 with the reception voice level detected by the reception input level detection rectifier 2104 and corresponding to the transmission output level returned on the line side to obtain the circulating gain (line gain) on the line side. The transmission system loss processing unit 2102 and the reception system loss processing unit 2101 are controlled by the control signals b and a in accordance with the magnitude of the line gain to insert the attenuation amounts into the transmission and reception voice outputs in accordance with the respective control signals. The gain is corrected on the basis of the line gain such that predetermined transmission and reception voice levels can be obtained, thereby preventing hands-free speech communication from failing due to variations in line gain.

In the voice switch processing unit 211, the loss control processing unit 2113 compares the transmission voice level detected by the transmission level detection rectifier 2115 with the reception voice level detected by the reception level detection rectifier 2114. The control signal d for controlling the transmission system loss processing unit 2112 and the control signal c for controlling the reception system loss processing unit 2111 are output in accordance with the comparison result. The sum value of the control signals d and c is always constant, and losses to be inserted into the line loop by the transmission system loss processing unit 2112 and the reception system loss processing unit 2111 are always constant. The reception system loss processing unit 2111 inserts an attenuation amount into the reception system voice output from the line gain correction processing unit 210 in accordance with the control signal c from the loss control processing unit 2113 and outputs the reception voice to the mobile-side echo canceler unit 22. The transmission system loss processing unit 2112 controls the maximum value of the attenuation amount to be inserted in accordance with the control signal e from the echo cancel amount detection processing unit 23, determines the attenuation amount to be actually inserted by using the control signal d from the loss control processing unit 2113 as a ratio to the maximum value, applies the attenuation amount to the transmission voice output from the mobile-side echo canceler unit 22, and outputs the transmission voice to the line gain correction processing unit 210.

The mobile-side echo canceler unit 22 is an echo canceler using an FIR type adaptive filter depending on learning identification as a known technique of estimating the tap coefficient.

The echo cancel amount detection processing unit 23 detects, on the basis of software, the microphone voice input level from the mobile-side microphone input terminal C, i.e., the input terminal of the mobile-side echo canceler 22 and the mobile-side transmission voice level output from the mobile-side echo canceler unit 22, in which the mobile-side echo is canceled, compares the two levels, and outputs the control signal e for controlling the maximum value of the attenuation amount of the transmission system loss processing unit 2112 in accordance with the comparison result.

The parameter reception processing unit 25 inputs a command/data from the main CPU of the externally connected cellular phone, converts the serial data into parallel data, and transfers the data to the parameter setting processing unit 24. The parameter setting processing unit 24 changes, on the basis of the command/data from the parameter reception processing unit 25, parameters $\alpha$ to $\epsilon$ in the parameter setting processing unit 24, parameters $\eta$ to $\pi$ in the voice switch parameter unit 241, and parameters $\tau$ to $\phi$ in the echo canceler parameter unit 242, thereby controlling the operations of the line gain correction processing unit 210, the voice switch processing unit 211, the mobile-side echo canceler unit 22, and the echo cancel amount detection processing unit 23.

The parameters will be described next. The parameter $\alpha$ determines the rising and falling time constants of the transmission output level detection rectifier 2105. The parameter $\beta$ determines the rising and falling time constants of the reception input level detection rectifier 2104. The parameter $\gamma$ determines the maximum attenuation amount of the transmission system loss processing unit 2102. The parameter $\delta$ determines the rising and falling time constants of the loss control processing unit 2103 and the operating point (threshold) at which the attenuation amount is inserted. The parameter $\epsilon$ determines the maximum attenuation amount of the reception system loss processing unit 2101. The parameter $\eta$ determines the rising and falling time constants of the reception level detection rectifier 2114. The parameter $\theta$ determines the rising and falling time constants of the loss control processing unit 2113 and the transmission/reception switching operating point (threshold). The parameter $\lambda$ determines the maximum attenuation amount of the transmission system loss processing unit 2112. The parameter $\mu$ determines the maximum attenuation amount of the reception system loss processing unit 2111. The parameter $\pi$ determines the rising and falling time constants of the transmission level detection rectifier 2115. The parameter $\tau$ determines the initial value and converging time of the tap coefficient of the adaptive filter 220 and echo cancel time (degree of tap). The parameter $\phi$ determines the time constant until the cancel amount detection of the echo cancel amount detection processing unit 23 and the operating point (threshold) for cancel amount detection.

With this arrangement, parameters for each country are given from the main CPU of the external cellular phone to the DSP, unlike the prior art which copes with the difference between line gains in various countries by changing the constants (hardware change) of parts for each country. That is, only by changing the software of the main CPU, the difference between lines gains in various countries can be coped with without any change in the hardware of the hands-free speech communication apparatus incorporating the echo canceler.

Figure 4:
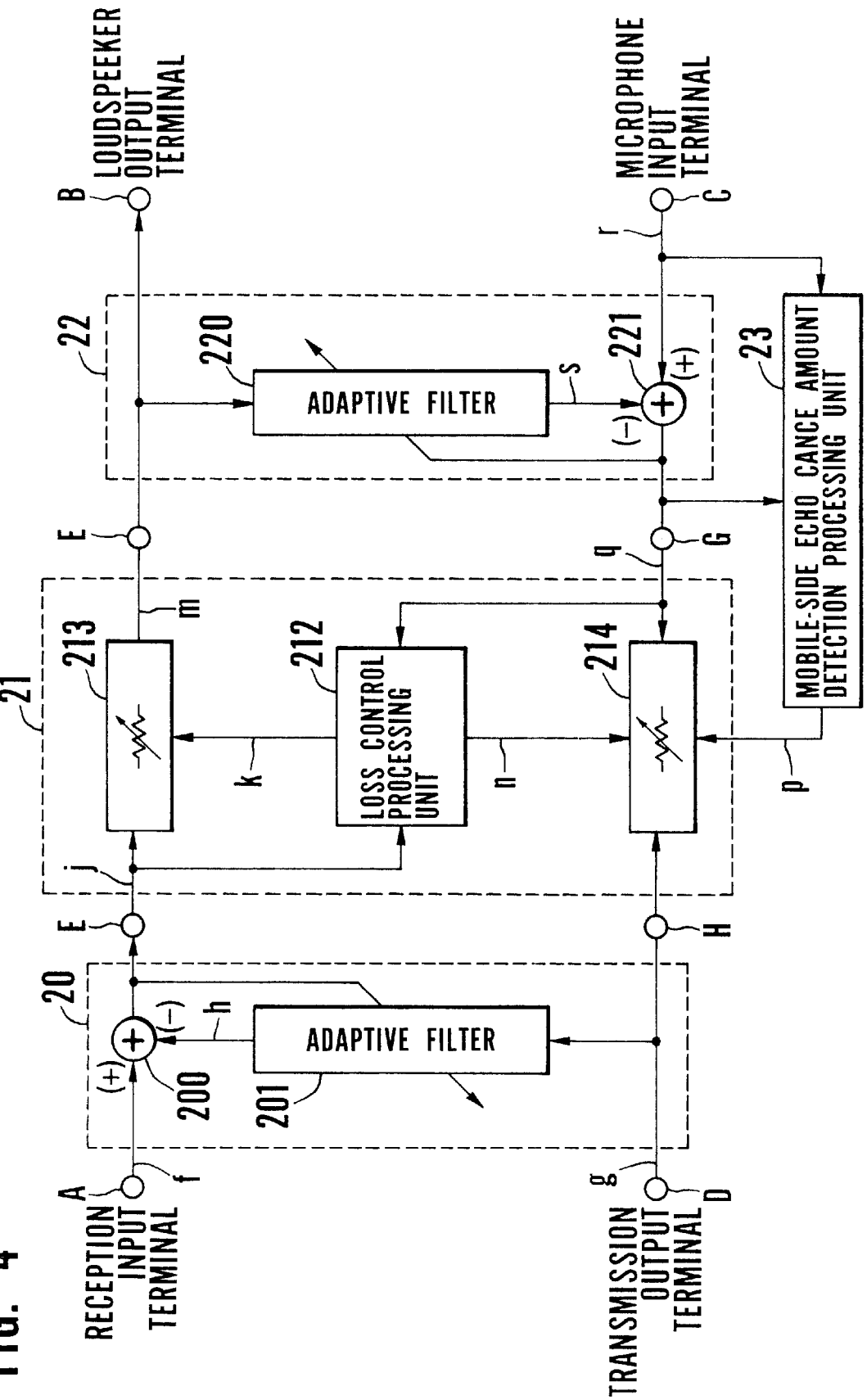
FIG. 4 is a block diagram showing the algorithm function of a hands-free speech communication apparatus according to the first embodiment of the present invention.

In the second embodiments, actually, the line-side echo canceler 20 shown in FIG. 4 of the first embodiment is connected to the input terminal of the line gain correction processing unit 210, although the line-side echo canceler 20 is omitted. The operation of the first embodiment has been only briefly described but can be easily understood from the description of the second embodiment, and a detailed description thereof will be omitted.

What is claimed is:

1. A hands-free speech communication apparatus incorporating an echo canceler in a mobile telephone, said communication apparatus comprising:

howling prevention means for preventing howling caused due to leakage of a mobile-side loudspeaker output into a mobile-side microphone input during hands-free speech communication;

echo cancel means for canceling an echo generated due to leakage of a transmission voice signal from a self line output terminal into a reception voice signal input to a self line input terminal, wherein said howling prevention means and said echo cancel means are constituted by a one-chip digital signal processor, and said digital signal processor is controlled by a microprocessor incorporated in an external cellular phone, thereby controlling operation parameters of said howling prevention means and said echo cancel means on the basis of software; and a parameter reception processing interface to provide operating parameters to said howling prevention means and said echo cancel means from said external microprocessor.

2. The communication apparatus according to claim 1 further comprising a voice switch, wherein said voice switch is disposed between said howling prevention means and said echo cancel means and receives data from and outputs data to said howling prevention means and said echo cancel means, and wherein said voice switch is constituted of said one-chip digital signal processor and controlled on the basis of the software of said microprocessor of said external cellular phone.

3. The communication apparatus according to claim 2, further comprising an echo cancel amount detection processing circuit for determining an echo cancel amount based on a first transmission signal input to said echo cancel means and a second transmission signal output from said echo cancel means, wherein said echo cancel amount detection processing circuit provides a control signal to the voice switch to attenuate data output to said howling prevention means and said echo cancel means.

4. A hands-free speech communication apparatus comprises:

a line-side echo canceler having:

first addition means for adding, to a first reception voice signal input from a line side to a reception input terminal, a second hands-free transmission signal in which a first hands-free transmission signal sent from a transmission output terminal to said line side is adaptively controlled to cancel a component leaking from the first hands-free transmission signal into the first reception voice signal, and outputting a second reception voice signal, and a first adaptive filter for adaptively controlling the first hands-free transmission signal in accordance with the second reception voice signal output from said first addition means and outputting and supplying the second hands-free transmission signal to said first addition means;

a voice switch having.

a first attenuation means, controlled by a first control signal, for applying a predetermined attenuation amount for preventing howling in the second reception voice signal output from said first addition means of said line-side echo canceler and outputting a third reception voice signal to a mobile-side loudspeaker output terminal, a second attenuation means, controlled by a second control signal and a third control signal, for applying a predetermined attenuation amount to a third hands-free transmission signal in which a component of the third reception voice signal which leaks from said mobile-side loud-speaker output terminal into a mobile-side microphone input terminal is canceled to cancel an echo, and outputting the first hands-free transmission signal, and first attenuation amount control means for outputting the second control signal in accordance with a level of the first hands-free transmission signal and outputting the first control signal in accordance with a level of the second reception voice signal;

a mobile-side echo canceler having:

second addition means for adding, to a fourth hands-free transmission signal input to said mobile-side microphone input terminal, a fourth reception voice signal in which the third reception voice signal output to said mobile-side loudspeaker output terminal is adaptively controlled to cancel a component which leaks from the third reception voice signal into the fourth hands-free transmission signal and outputting the third hands-free transmission signal, and a second adaptive filter for adaptively controlling the third reception voice signal in accordance with the third hands-free transmission signal output from said second addition means and outputting and supplying the fourth reception voice signal to said second addition means; and echo cancel amount detection processing means for comparing the fourth hands-free transmission signal with the third hands-free transmission signal to detect an echo cancel amount of said mobile-side echo canceler and outputting the third control signal corresponding to the echo cancel amount to said second attenuation means, wherein said line-side echo canceler, said voice switch, said mobile-side echo canceler, and said echo cancel amount detection processing means are constituted by a one-chip digital signal processor, and operation parameters of said line-side echo canceler, said voice switch, said mobile-side echo canceler, and said echo cancel amount detection processing means are controlled on the basis of software by a microprocessor incorporated in an external cellular phone.

5. An apparatus according to claim 4, further comprising line gain correction processing means having:

third attenuation means, controlled by a fourth control signal, for applying a predetermined attenuation amount for downlink line gain correction to the second reception voice signal output from said first addition means of said line-side echo canceler, and outputting a corrected reception voice signal to said first attenuation means of said voice switch, fourth attenuation means, controlled by a fifth control signal, for applying a predetermined attenuation amount for uplink line gain correction to the first hands-free transmission signal output from said second attenuation means of said voice switch, and outputting a corrected transmission signal to a transmission output terminal and said first adaptive filter of said line-side echo canceler, and second attenuation amount control means for outputting the fourth control signal in accordance with the level of the second reception voice signal output from said first addition means and outputting the fifth control signal in accordance with a level of the first hands-free transmission signal output from said second attenuation means of said voice switch, and wherein said line gain correction processing means is constituted in said one-chip digital signal processor, and operation parameters of said third attenuation means, said fourth attenuation means, and said second attenuation amount control means are controlled on the basis of software by said microprocessor incorporated in said external cellular phone.

6. The communication apparatus according to claim 5, further comprising a parameter reception processing interface between said microprocessor of said external cellular phone and said digital signal processor to provide operating parameters to said line gain correction processing means.

7. The communication apparatus according to claim 4, further comprising a parameter reception processing interface between said microprocessor of said external cellular phone and said digital signal processor to provide operating parameters to said line side echo canceler, said mobile-side echo canceler, said voice switch, and said echo cancel amount detection processing means.

8. A hands-free speech communication apparatus incorporating an echo canceler in a mobile telephone, said communication apparatus comprising:

howling prevention means for preventing howling caused due to leakage of a mobile-side loudspeaker output into a mobile-side microphone input during hands-free speech communication;

echo cancel means for canceling an echo generated due to leakage of a transmission voice signal from a self line output terminal into a reception voice signal input to a self line input terminal, wherein said howling prevention means and said echo cancel means are constituted by a one-chip digital signal processor, and said digital signal processor is controlled by a microprocessor incorporated in an external cellular phone, thereby controlling operation parameters of said howling prevention means and said echo cancel means on the basis of software;

a voice switch, wherein said voice switch is disposed between said howling prevention means and said echo cancel means and receives data from and outputs data to said howling prevention means and said echo cancel means, and wherein said voice switch is constituted of said one-chip digital signal processor and controlled on the basis of the software of said microprocessor of said external cellular phone;

an echo cancel amount detection processing circuit for determining an echo cancel amount based on a first transmission signal input to said echo cancel means and a second transmission signal output from said echo cancel means, wherein said echo cancel amount detection processing circuit provides a control signal to the voice switch to attenuate data output to said howling prevention means and said echo cancel means; and a parameter reception processing interface between said microprocessor of said external cellular phone and said digital signal processor to provide operating parameters to said howling prevention means, said echo cancel means, and said voice switch.

* * * * *